(12) United States Patent
Nichols et al.

(10) Patent No.: US 10,133,994 B2
(45) Date of Patent: *Nov. 20, 2018

(54) MANAGEMENT OF MATERIALS ON A CONSTRUCTION SITE

(71) Applicant: Trimble Inc., Sunnyvale, CA (US)

(72) Inventors: Mark E. Nichols, Christchurch (NZ); Bryn Fosburgh, Longmont, CO (US); Christopher David Richardson, Canterbury (AU); Peter Graham Gipps, Brighton (AU); George Derrick Darby, Jr., Dunwoody, GA (US)

(73) Assignee: Trimble Inc., Sunnyvale, CA (US)

( * ) Notice: Subject to any disclaimer, the term of this patent is extended or adjusted under 35 U.S.C. 154(b) by 725 days.

This patent is subject to a terminal disclaimer.

(21) Appl. No.: 13/626,727

(22) Filed: Sep. 25, 2012

(65) Prior Publication Data

US 2013/0024245 A1 Jan. 24, 2013

Related U.S. Application Data

(63) Continuation of application No. 12/325,642, filed on Dec. 1, 2008, now Pat. No. 8,306,836.

(51) Int. Cl.
| | | |
|---|---|---|
| G06Q 10/00 | (2012.01) | |
| G06Q 10/06 | (2012.01) | |
| G06Q 10/08 | (2012.01) | |
| G06Q 30/02 | (2012.01) | |

(52) U.S. Cl.
CPC ..... *G06Q 10/063* (2013.01); *G06Q 10/06313* (2013.01); *G06Q 10/087* (2013.01); *G06Q 30/0283* (2013.01)

(58) Field of Classification Search
CPC .............. G06Q 10/047; G06Q 10/063; G06Q 10/06313; G06Q 10/087; G06Q 30/0283; G06Q 50/08
USPC ............. 705/7, 8, 7.11–7.42, 35, 37; 701/50
See application file for complete search history.

(56) References Cited

U.S. PATENT DOCUMENTS

| | | |
|---|---|---|
| 5,189,606 A | 2/1993 | Burns et al. |
| 6,128,574 A | 10/2000 | Diekhans |
| 6,191,732 B1 * | 2/2001 | Carlson ................... E02F 3/842 342/357.3 |
| 6,446,053 B1 * | 9/2002 | Elliott .......................... 705/400 |
| 7,421,334 B2 | 9/2008 | Dahlgren et al. |
| 7,720,703 B1 * | 5/2010 | Broughton ................... 705/7.23 |
| 7,835,838 B2 | 11/2010 | Pillar et al. |

(Continued)

*Primary Examiner* — William S Brockington, III
(74) *Attorney, Agent, or Firm* — Kilpatrick Townsend and Stockton

(57) ABSTRACT

In a computer implemented method for management of materials on a construction site, a status of a project which uses at least one material is determined by a computer system. A report is generated by the computer system. The report identifies a vehicle, from a vehicle pool, to be utilized to move the material and defines a load of the material which is to be moved by the vehicle, according to a mass haul plan, from a first location to a second location. The vehicle is identified based on results of a simulation. The status of the project is automatically updated by the computer system based on an actual size and an actual drop-off location of the load of the material moved by the vehicle. The computer system updates the report based on the updating of the status of the project.

9 Claims, 8 Drawing Sheets

(56) References Cited

U.S. PATENT DOCUMENTS

| | | |
|---|---|---|
| 8,004,397 B2 * | 8/2011 | Forrest et al. ............. 340/539.1 |
| 8,144,245 B2 | 3/2012 | Vik et al. |
| 8,306,836 B2 | 11/2012 | Nichols et al. |
| 8,386,283 B2 | 2/2013 | Hand et al. |
| 8,626,511 B2 | 1/2014 | Lebeau et al. |
| 8,626,541 B2 * | 1/2014 | Doan et al. .................. 705/7.11 |
| 2001/0027407 A1 | 10/2001 | Mori |
| 2003/0018507 A1 * | 1/2003 | Flanagan .......................... 705/8 |
| 2003/0093242 A1 * | 5/2003 | Olsson ................ G01M 13/021 |
| | | 702/182 |
| 2005/0065711 A1 | 3/2005 | Dahlgren et al. |
| 2007/0233542 A1 * | 10/2007 | Dubreuil et al. ................. 705/8 |
| 2008/0195434 A1 * | 8/2008 | Broughton ........................ 705/7 |
| 2008/0202777 A1 * | 8/2008 | Corcoran ................ E02D 1/027 |
| | | 172/1 |
| 2008/0208415 A1 * | 8/2008 | Vik ................................. 701/50 |
| 2009/0063222 A1 * | 3/2009 | Doan et al. ....................... 705/7 |
| 2009/0063226 A1 * | 3/2009 | Greiner ............... G06Q 10/047 |
| | | 705/7.26 |
| 2009/0198505 A1 * | 8/2009 | Gipps et al. ...................... 705/1 |
| 2011/0231217 A1 * | 9/2011 | Hand ........................... 705/7.12 |
| 2013/0024245 A1 | 1/2013 | Nichols et al. |
| 2013/0035978 A1 | 2/2013 | Richardson et al. |

* cited by examiner

| 301 | 302 | 303 | 304 | 305 | 306 | 307 | 308 | 309 | 310 | 311 | 312 | 313 | 314 | 315 |
|---|---|---|---|---|---|---|---|---|---|---|---|---|---|---|
| Distance | Machine(s) | Hourly O&O cost | Volume/hr (m³) | | | | | | Cost/linear cubic meter | | | | | |
| | | | Clay | Topsoil | | Rock | | | Clay | | Topsoil | | Rock | |
| | | | Wet | Dry | Wet | Dry | Wet | Dry | Wet | Dry | Wet | Dry | Wet | Dry |
| 0-100m | D6R | $200 | 200 | 300 | 250 | 325 | 200 | 200 | $100 | $67 | $80 | $62 | $100 | $100 |
| | Scraper | $175 | 100 | 400 | 200 | 450 | 50 | 50 | $175 | $44 | $88 | $39 | $350 | $350 |
| | 320/1xD400 | $250 | 75 | 100 | 100 | 125 | 75 | 75 | $333 | $250 | $250 | $200 | $333 | $333 |
| | 320/2xD400 | $350 | 75 | 100 | 100 | 125 | 75 | 75 | $467 | $350 | $350 | $280 | $467 | $467 |
| | 320/3xD400 | $450 | 75 | 100 | 100 | 125 | 75 | 75 | $600 | $450 | $450 | $360 | $600 | $600 |
| 100-200m | D6R | $200 | 100 | 150 | 125 | 162.5 | 100 | 100 | $400 | $267 | $320 | $246 | $400 | $400 |
| | Scraper | $175 | 100 | 250 | 150 | 275 | 30 | 30 | $350 | $149 | $233 | $127 | $1,167 | $1,167 |
| | 320/1xD400 | $250 | 65 | 100 | 65 | 100 | 65 | 65 | $769 | $500 | $769 | $500 | $769 | $769 |
| | 320/2xD400 | $350 | 100 | 150 | 100 | 150 | 75 | 75 | $700 | $467 | $700 | $467 | $933 | $933 |
| | 320/3xD400 | $450 | 100 | 150 | 100 | 150 | 75 | 75 | $900 | $600 | $900 | $600 | $1,200 | $1,200 |
| 200-500m | D6R | $200 | 40 | 60 | 50 | 65 | 40 | 40 | $2,500 | $1,667 | $2,000 | $1,538 | $2,500 | $2,500 |
| | Scraper | $175 | 20 | 80 | 40 | 90 | 20 | 20 | $4,375 | $1,094 | $2,188 | $972 | $4,275 | $4,275 |
| | 320/1xD400 | $250 | 75 | 100 | 100 | 125 | 75 | 75 | $1,667 | $1,250 | $1,250 | $1,000 | $1,667 | $1,667 |
| | 320/2xD400 | $350 | 125 | 180 | 125 | 180 | 75 | 75 | $1,400 | $972 | $1,400 | $972 | $2,333 | $2,333 |
| | 320/3xD400 | $450 | 150 | 200 | 175 | 225 | 75 | 75 | $1,500 | $1,125 | $1,286 | $1,000 | $3,000 | $3,000 |
| >500m | D6R | $200 | 20 | 30 | 25 | 32.5 | 20 | 20 | $5,000 | $3,333 | $4,000 | $3,077 | $5,000 | $5,000 |
| | Scraper | $175 | 10 | 40 | 20 | 45 | 5 | 5 | $8,750 | $2,188 | $4,375 | $1,944 | $17,500 | $17,500 |
| | 320/1xD400 | $250 | 75 | 100 | 100 | 125 | 75 | 75 | $1,667 | $1,250 | $1,250 | $1,000 | $1,667 | $1,667 |
| | 320/2xD400 | $350 | 125 | 180 | 125 | 180 | 75 | 75 | $1,400 | $972 | $1,400 | $972 | $2,333 | $2,333 |
| | 320/3xD400 | $450 | 200 | 250 | 200 | 250 | 75 | 75 | $1,125 | $900 | $1,125 | $900 | $3,000 | $3,000 |

MANAGEMENT OF MATERIALS ON A CONSTRUCTION SITE

CROSS-REFERENCE TO RELATED U.S. APPLICATION (CONTINUATION)

This application is a continuation application of and claims the benefit of co-pending U.S. patent application Ser. No. 12/325,642 filed on Dec. 1, 2008 entitled "MANAGEMENT OF MATERIALS ON A CONSTRUCTION SITE" by Mark Nichols et al., and assigned to the assignee of the present application; the disclosure of which is hereby incorporated by reference herein in its entirety.

FIELD OF THE INVENTION

Embodiments are related to the field of the management of materials on a construction site.

BACKGROUND

When planning a road, or railroad line, a model is created which shows the final alignment contouring of terrain along the road. The final contouring includes earthworks and structures built in the course of constructing the road. An important part of the contouring includes a cut/fill plan which details portions of the road which are cut and then used to fill other portions of the road. For example, a portion of a hillside may be cut and used to fill in a ravine or gully. Typically, this results in a more level roadbed and reduced construction costs.

After planning which portions of the terrain are to be cut and filled. A mass haul diagram is created which details the mass, direction, and average length of haul of material from the cut site to the fill site. Typically, the mass haul diagram shows movement of material from the center mass of where the fill material is taken from the cut site to center mass of the fill site where the fill material is deposited.

SUMMARY

In a computer implemented method for management of materials on a construction site, a status of a project which uses at least one material is determined by a computer system. A report is generated by the computer system. The report identifies a vehicle, from a vehicle pool, to be utilized to move the material and defines a load of the material which is to be moved by the vehicle, according to a mass haul plan, from a first location to a second location. The vehicle is identified based on results of a simulation. The status of the project is automatically updated by the computer system based on an actual size and an actual drop-off location of the load of the material moved by the vehicle. The computer system updates the report based on the updating of the status of the project.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

FIG. 3 shows an example cost scenario generated in accordance with one embodiment.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "defining," "determining," "generating," "receiving," "identifying," "conveying," "estimating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
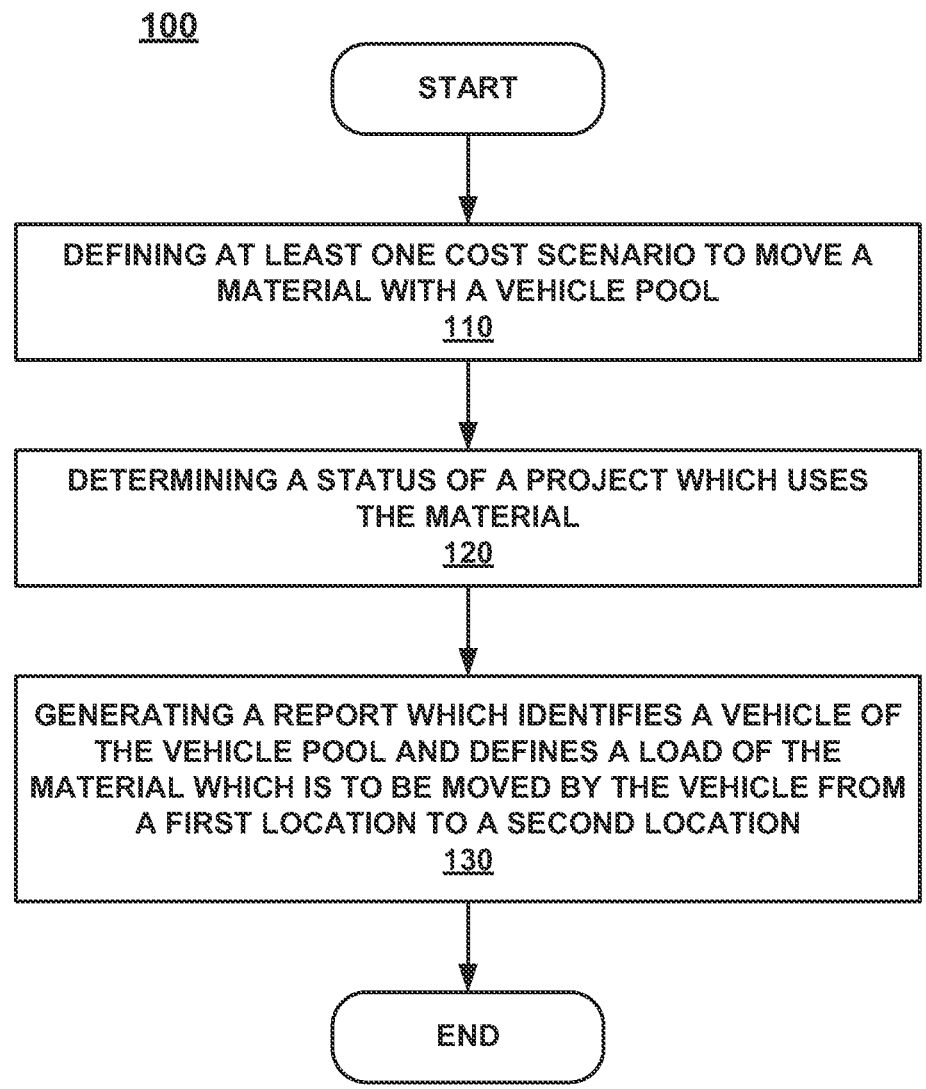
FIG. 1 is a flowchart of a method of asset management of a material on a construction site in accordance with one embodiment.

FIG. 1 is a flowchart of a computer implemented method 100 for asset management of a material on a construction site in accordance with one embodiment. In one embodiment, asset management comprises creating a plan for moving soil on a construction site. More specifically, a report is generated which indicates scenarios for moving material from a cut section to another location of the site such as a fill section. In operation 110 of FIG. 1, at least one cost scenario to move a material with a vehicle pool is defined. In accordance with one embodiment, a vehicle pool for a site such as a construction site is defined. In one embodiment, this further comprises identifying the types of vehicle(s) comprising the vehicle pool. For example, bulldozers, scrapers, dump trucks, excavators, etc. are identified. The identification of the vehicle pool may additionally comprise performance parameters of the vehicles such as load capacity for moving material, ownership and operating costs, vehicle speed, and other variables which indicate how efficiently and/or how quickly a particular vehicle of the vehicle pool can move a material around a site. It is noted that the vehicle pool comprises at least one vehicle which is, or will be, available at the site.

The identification of the vehicle pool can also comprise the availability of vehicles of the vehicle pool. For example, some vehicles may not be available due to scheduled maintenance, or a break down of the vehicle. Additionally, vehicles can be rented, or brought in from other work sites, in order to increase the size of the vehicle pool. In one embodiment, additional cost scenarios can be defined using different mixes of vehicles in the vehicle pool. For example, a user can change the makeup of the vehicle pool and generate a cost scenario to determine whether renting additional bulldozers, trucks, or other earthmoving equipment is beneficial. Thus, the user can identify the mix of vehicles which will move the greatest volume of material on the site in a given amount of time. Alternatively, the user can identify the mix of vehicles which will move the material at the lowest cost to the user. Additionally, the user can determine the impact that scheduled maintenance, transfer of vehicles, or equipment breakdown, will have on a project.

Additionally, variables of the material being moved are used to define the cost scenario. For example, at a construction site, the moisture content of soil being moved affects the cost of moving the soil around the site. As a result, soil with a high moisture content is heavier, and therefore more expensive to move, than soil with a lower moisture content because less wet soil can be moved per load. It is noted that while the above example cites soil specifically, other materials can be included in the cost scenario. For example, pipes, pre-cast structures, or other materials which are utilized at the site can be defined in the cost scenario.

In operation 120 of FIG. 1, the status of a project which uses the material is determined. Again using the example of a construction site, a contractor receives a set of plans which show the initial, or current, terrain configuration of the site. This includes the elevation of features of the site such as hills, ridges, valleys, depressions, and the like. The contractor also has a set of plans which show the desired terrain configuration of the site. The desired terrain configuration of the site may be the final desired terrain configuration of the site, or an interim terrain configuration. Typically, these plans are in the form of digital site plans. As an example, a building site may require a level area for buildings, as well as graded areas for roads. In the case of a road, or railroad line, the final surface plan shows the path of the roadbed, grading of curves, as well as cut sections and fill sections in the terrain which reduce the number of changes in elevation in the road. These projects typically entail a large amount of earth moving. From these plans, the contractor develops one or more plans which show various stages of the construction site. Thus, the status of the project shows the correlation of the current terrain configuration of the site with a desired terrain configuration of the site.

The initial set of plans may also include geological data such as soil types at various locations of the site as well as the depths of those soil types. For example, the geological data may indicate that a layer of sand which extends to a depth of 10 meters overlies a layer of rock at a first location, while at a second location of the site, a 25 meter thick layer of clay exists.

Additionally, the status of the project can describe the distance which a particular load of material is to be moved in the site. In one embodiment, this comprises the distance to move the material from a first location of the site to a second location of the site. As an example, the distance to move material from a location in a cut section of the terrain to a location in a fill section of the terrain. Additional data used to determine the status of the project can include a road condition between the first location of the site and the second location of the site. For example, if a road between the first location of the site and the second location of the site is muddy, it can affect the choice of vehicles used to move the material from the first site to the second site and affect how quickly those vehicles can be operated.

Additionally, the status of the project can include how fast the material can be moved from the first location of the site to the second location of the site. For example, if at least a portion of the road between the first location of the site and the second location of the site is paved, the material can be moved faster than if the road is not paved. This can also affect how efficiently various vehicles of the vehicle pool can move the material around the site. Additionally, traffic conditions at certain times of the day affect how fast material can be moved to, from, or within a site. For example, during periods of peak traffic volume, the material cannot be moved a quickly as during off-peak hours.

The status of the project may also include a time when the material is to be moved from the first location to the second location. Because preparation of the second location may be necessary prior to moving the material from the first location, the status of the project may include various benchmarks which trigger subsequent events. As an example, the finished site plan may specify a culvert at the second location of the site. Therefore, it may be desired that the status of the project indicates that the culvert has been completed at the second location prior to moving fill material from the first location to the second location. As another example, the availability of materials and/or equipment may be included in the status of the project. For example, if there is no asphalt, or machinery to lay it, available for a week, the priority to fill a portion of the terrain may be reduced. This may affect the choice of vehicles to move the material from the first location to the second location as a slower, more economical choice of vehicles may become more desirable based upon the status of the project. Additionally, the time when the material is to be moved may also be affected by on-site and/or offsite traffic conditions.

In one embodiment, the status of the project can comprise a weather variable. For example, the status can include historical data that shows that it rains 30% of the time when the project is to be built. This can affect how many days the project may be delayed due to weather. Alternatively, this can affect the pace at which work proceeds, or the type of work which can be performed, during the rainy weather. The status can also include more current conditions such as the amount of rain in the last day, week, or other prior period. This data can also be used to determine the moisture content of material being moved on the site, as well as road conditions on the site.

In one embodiment, the status of the project can also comprise the vehicle operators available at a given time of the project. For example, some operators may be sick, on vacation, or otherwise unavailable at a point in the project. Additionally, operator availability impacts wages as a comparison of the benefits of working one or more operators at overtime wages rather than ordinary wages may be considered. Operator availability may also affect how quickly benchmarks in the progress of the project can be completed. Additionally, the productivity of a particular operator may affect the status of a project. It is possible to collect data which reflects the productivity of employees at a site and use this data to determine how it will affect the status of the project in the future. For example, a less skilled operator of an excavator may only perform 75% of the workload which can be performed by a more experienced operator. This in turn affects how much material can be moved at a site and how long it will take to move it.

In operation 130 of FIG. 1, a report is generated which identifies a vehicle of the vehicle pool and defines a load of the material which is to be moved by the vehicle from a first location to a second location. As previously stated, the contractor develops a mass haul plan which shows how material cut from one portion of the site is to be used to fill other portions of the site. The mass haul plan typically shows the mass, direction, and average length of haul of material. However, this fails to account for the distance each load of material travels when it is moved from a first location of the site (e.g., from a cut section in the terrain) to a second location of the site (e.g., to a fill section in the terrain).

As an example, successive loads of material may have to be transported farther as the cut/fill process proceeds. Furthermore, conventional mass haul plans do not account for the various vehicles which can be used to move the material. For example, a bulldozer can move material very efficiently for short distances due to the fact that it does not have to load and unload material in the manner of a dump truck which therefore decreases the round-trip time per load of material moved by the bulldozer. At greater distances, the bulldozer is less efficient at moving material because it is slower than most dump trucks. Because they fail to account for the vehicles which can be used to move the material, conventional mass haul plans also fail to account for how quickly material can be moved from one location of the site to a second location. Additionally, conventional mass haul plans fail to account for variables such as the moisture content of the material being moved, the cost to operate various vehicle types, as well as the status of the project. As a result, a conventional mass haul plan conveys a general idea of the source and destination of material, but does not provide detailed information based upon the vehicle pool, status of the project, or other variables which affect the cost and/or the completion date of the project.

In contrast, one embodiment takes these factors into account when generating a report 231 which identifies a vehicle of the vehicle pool and a load of material which is to be moved by that vehicle from a first location of a site to a second location of the site. This report can further identify each load of material that is to be moved by each vehicle at a site. In one embodiment, the report takes into account the available vehicles of a vehicle pool; including vehicles which may be brought in from an outside site such as a rental agency, or a second worksite. The report also takes into account variables of the material such as its moisture content which can affect how material can be moved per load, or how quickly it can be loaded, moved, and unloaded. The report also accounts for variables affecting the status of the project including, but not limited to, weather and road conditions, available vehicles and operators, operator productivity, times when materials can be moved, other benchmarks in the completion of the project, how fast the material can be moved, how far the material is to be moved, the current and desired terrain configurations of the project, geological conditions, etc. In so doing, one embodiment can provide a detailed estimate of the cost of moving material around the site and/or identify the most economical or fastest method of moving the material around the site. The report can also identify how changes in the mix of vehicles on a site affect the cost, or the completion time, of a project. Thus, embodiments provide a report which describes in greater detail than a conventional mass haul plan, how to move material on a site to better suit the needs of a user.

Figure 2:
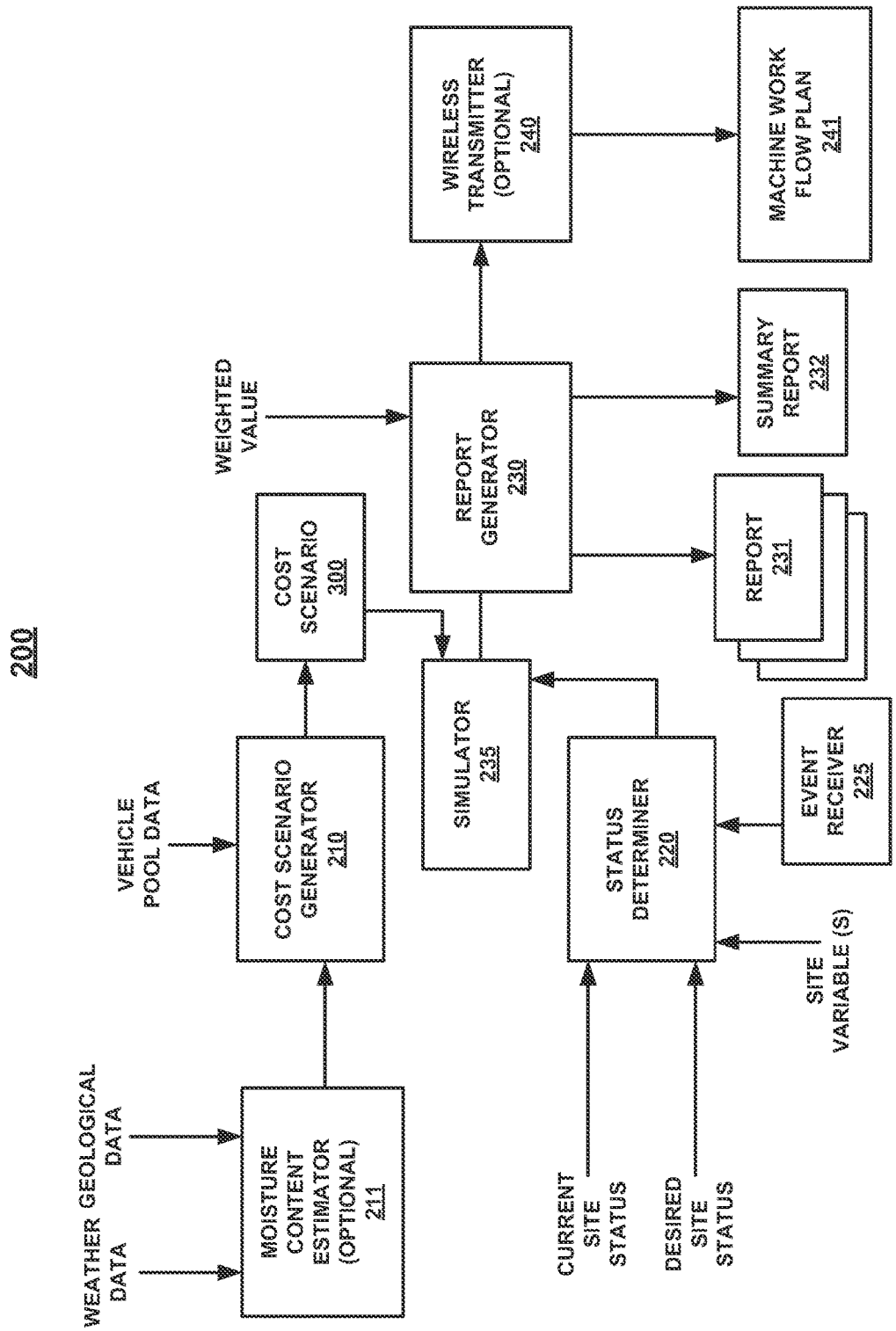
FIG. 2 is a block diagram of an example system for asset management of a material on a construction site in accordance with one embodiment.

FIG. 2 is a block diagram of an example system for asset management of a material on a construction site in accordance with one embodiment. In the embodiment of FIG. 2, system 200 comprises a cost scenario generator 210 which is configured to define at least one cost scenario to move an asset with a vehicle pool. Furthermore, in the embodiment of FIG. 2, an optional moisture content estimator 211 is shown coupled with cost scenario generator 210. In one embodiment, moisture content estimator 211 generates an estimate of the moisture content of material at a location in a construction site. In one embodiment, recent weather data and geological data from a plurality of locations within a site are input to moisture content estimator 211. As an example, weather data may indicate that it has rained 5 inches in the last 2 weeks and that the soil at a first location within a construction site is mainly clay. Using this data, moisture content estimator 211 can estimate the moisture content of the clay at that location. Alternatively, a measurement of the moisture content of the soil from that location can be input to cost scenario generator 210.

Figure 4:
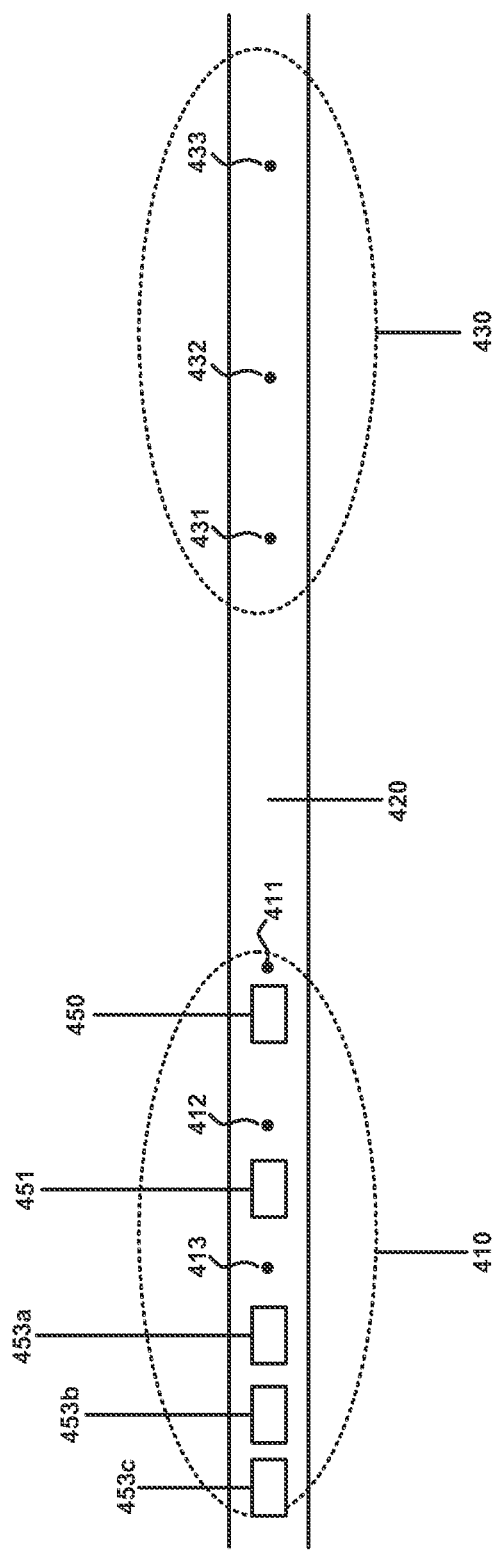
FIG. 4 shows an example construction site in accordance with one embodiment.

As an illustration, FIG. 4 shows an example construction site 400 in accordance with one embodiment. In FIG. 4, a road construction project is underway to complete a road 420. In FIG. 4, region 410 represents a cut section within site 400. This cut material is then taken along road 420 to a region 430 which represents a fill section of site 400. Within region 410, locations 411, 412, and 413 are shown as well as locations 431, 432, and 433 of region 430. In one embodiment, moisture content estimator 211 can receive the geological data from locations 411, 412, and 413 and estimate the moisture content of that material based upon recent weather conditions. Alternatively, a measurement from locations 411, 412, and 413 can be input to cost scenario generator 210.

Cost scenario generator 210 receives the estimate of moisture content and vehicle pool data and generates at least one cost scenario 300. Cost scenario 300 is described in greater detail below and defines the cost to move material over a distance for different machine mixes from the vehicle pool. The cost scenario is also based at least in part on material types and the moisture content of that material for a location within, for example, site 400. In one embodiment, cost scenario generator 210 can use data from equipment handbooks provided by manufacturers of earth moving equipment regarding the productivity costs and owning and operating costs of a particular machine. Alternatively, an operator of a machine on site 400 may have generated similar data based upon actual performance of each machine on site 400. This data can be used to determine the volume of material that can be moved by each vehicle on site 400 as well as the cost to move material for a given time period based upon the cost to operate each individual vehicle. In one embodiment, the availability of vehicles on site 400 is also input into cost scenario generator 210. This may include when vehicles will be unavailable due to scheduled maintenance, or because those vehicles may be needed at another site at a specific time. The availability of vehicles may also include a description of vehicles from other sites which may be transferred to site 400, additional vehicles which can be rented or purchased for use on site 400 as well as when those vehicles will be available. Thus, given the types of vehicles comprising the vehicle pool at site 400 at a given time, cost scenario generator 210 generates cost scenario 300 which indicates the volume of material which can be moved in a time period, or the cost to move material in a time period. Furthermore, cost scenario 300 can indicate the volume of material which can be moved in a time period, or the cost to move material in a time period based upon projected vehicle availability at that time period.

In FIG. 2, system 200 further comprises a status determiner 220 which is configured to determine the status of a project. In one embodiment, status determiner 220 receives data about the current status of site 400 as well as a desired status of site 400. It is again noted that the current status of site 400 may be the initial status of the site before any construction has begun, or an interim status of site 400 based upon work which has been completed. Similarly, the desired status of site 400 can comprise an interim status of site 400, or the final desired terrain configuration of site 400. In one embodiment, status determiner 220 creates a digital model of the current status of site 400 and the desired status of site 400. This model, as well as cost scenario 300 and other site variables, can be used by simulator 235 to generate a simulation which models each load of material moved by a vehicle from a first location to a second location of site 400.

As described above, status determiner 220 also receives site variables of site 400 affecting the status of the project including, but not limited to, weather and road conditions, available vehicles and operators, operator productivity, times when materials can be moved, other benchmarks in the completion of the project, how fast the material can be moved, how far the material is to be moved, the current and desired terrain configurations of the project, geological conditions, etc. In one embodiment, the current status of the project can be automatically updated at regular intervals such as hourly, daily, weekly, etc. to assist in generating report 231 and/or machine work flow plan 241. This can also reflect differences in projected conditions at site 400 as opposed to those which actually occur. For example, a driver may be instructed to dump 40 cubic meters of material at a given location. However, upon examining the work performed, it is determined that the driver actually only delivered 35 cubic meters of material at a location 50 meters from the actual location. Using this information, status determiner 220 can alter its reporting of the current status of site 400 so that an updated report can be generated. Thus, status determiner 220 is used to receive data indicating variables which may affect the selection of a course of action in moving material around site 400.

In FIG. 2, system 200 further comprises an event receiver 225 which is coupled with status determiner 220. Event receiver 225 is for receiving a wireless transmission from a vehicle on site 400 which describes an event performed by the vehicle and/or a status of the vehicle. For example, many construction vehicles are equipped with machine control and guidance systems which use position determining components to log events and the geographic positions where these events take place. One example is the Trimble GCS900 system which is commercially available from Trimble Navigation Limited, of Sunnyvale, Calif. In one embodiment, event receiver 225 receives an indication from a vehicle on site 400 which describes an action or event which has been performed by the vehicle. For example, a bulldozer can report that it has moved a load of soil from a first location to a second location of site 400. Because the vehicle control systems frequently use position determining systems (e.g., a terrestrial based, or satellite based position determining system such as the Global Navigation Satellite System or GNSS), system 200 can determine how events such as moving soil affect the status of site 400.

In one embodiment, simulator 235 is configured to simulate the movement of earth, or other materials, based on the vehicle type being used. This can be performed on a load by load basis for each vehicle on site 400. Typically, a plurality of simulations is generated by simulator 235 in which the material, the mix of vehicles used to move the material, and the distances which the material is moved are varied. In one embodiment, the simulation(s) model each load of material moved by each vehicle on site 400. By varying the parameters in which the material is moved by the vehicles, simulator 235 creates a model(s) for moving the material to transform the site from its current status to the desired status of the site.

In FIG. 2, system 200 further comprises a report generator 230 which is configured to generate at least one report 231 which identifies at least one vehicle of the vehicle pool and defines which load of material is to be moved by the vehicle from a first location to a second location. As described above, simulator 235 receives cost scenario 300 as well as data from status determiner 220. Based upon the simulation(s) generated by simulator 235 a report(s) 231 is generated by report generator 230. Each report 231 generated by report generator 230 describes the mix of vehicles on site 400 that can be used to complete the project based upon the respective simulation run by simulator 235. Thus, report 231 describes in detail where material is picked up, by which vehicle, and where the material is dropped off. In one embodiment, report 231 describes the movement of each load of material on site 400 on a load by load basis. In other words, each load is described in terms of what the material comprises (e.g., gravel, sand, topsoil, clay, etc.), which vehicle is moving that load of material, and where the material is picked up and dropped off by that vehicle. This provides a much more detailed estimate of the time and cost to complete a project on site 400. Additionally, a user of system 200 can add or subtract vehicles from the vehicle pool data which is input to cost scenario generator 210. In so doing, a variety of simulations can be run by simulator 235 which describe how varying the mix of vehicles used at site 400 will affect the cost, and/or time to complete a project on site 400.

In one embodiment, report generator 230 can also receive an indication of a weighted value which is used to determine a load of material which is to be moved by a particular vehicle from a first location to a second location of site 400. System 200 can select from the plurality of simulations generated by simulator 235 to select options which best fit the parameters identified by the user of system 200. For example, a weighted value can indicate that material is to be moved from a first location to a second location of site 400 in the least expensive manner possible given the current available resources. As a result, the simulation(s) in which the estimated cost to move the material is the lowest will be selected and/or identified by report generator 230.

Alternatively, a weighted value can indicate that material is to be moved a quickly as possible from a first location to a second location of site 400. Based upon this input, the simulation(s) in which the greatest volume of material can be moved in a given time period will be selected and/or identified by report generator 230. In another embodiment, the weighted value can indicate some balance of cost and speed in moving material. As an example, the cost of moving material may receive a weighted value of 80% while the speed of moving the material may receive a weighted value of 20%. A user can input different weighted values which causes report generator 230 to alter the parameters of the simulations which it runs in order to generate a report 231. Additionally, other conditions may affect the weighted value. For example, if an incentive bonus will be paid to complete the project early, this may factor into how material is moved from a first location to a second location of site 400. Alternatively, an absolute deadline for completing the project may be a factor in determining how material is moved from a first location to a second location of site 400.

In one embodiment, report generator 230 also creates a summary report 232. In one embodiment, summary report 232 provides a user of system 200 a variety of options for completing a project on site 400. For example, if three reports 231 are generated by report generator 230, summary report 232 will describe the cost of implementing each option as well as the anticipated date of completion for the project for each respective option. Summary report 232 can also describe which operators should be operating particular vehicles on site 400 based upon the availability and the productivity of each respective operator. Summary report 232 can also generate recommendations for bringing additional vehicles, or other equipment, into the vehicle pool based upon variables identified by the use of system 200. Summary report 232 can also generate recommendations as to whether it is advantageous to work some, or all, of the equipment operators on overtime, including how much overtime, based upon user identified parameters. The user of system 200 can then decide which option to implement in order to complete the project at site 400.

Because system 200 can receive updated information regarding vehicle availability as well as the status of site 400 and other variables, system 200 can generate updated reports 231 and updated summary reports 232 periodically. As an example, if a bulldozer breaks down, this can be reported to system 200 and an updated report 231 can be generated based upon a new simulation generated by simulator 235. The updated report 231 can describe how to use the remaining vehicles on site 400 in order to make up for the loss of the disabled vehicle. It is noted that report generator 230 can also generate an updated summary report 232 which describes the cost of implementing each of a plurality of options based upon changes in vehicle, or operator availability, or other conditions at site 400. Thus, system 200 can dynamically provide near real-time recommendations for utilizing assets such as vehicles and other equipment on a construction site as conditions at the site change.

In one embodiment, system 200 can use data for a plurality of sites including site 400. For example, a contractor may be working at multiple sites which are physically separate. In one embodiment, the data described above for each of the respective sites is input to system 200. System 200 can then optimize the use of resources across the plurality of sites. Thus, a user of system 200 can plan the best use of resources across these sites based upon a report(s) from system 200. For example, a user of system 200 can input the data for each of the respective sites and develop a work flow plan for using a bulldozer at a plurality of sites most effectively. The work flow plan will describe which site the bulldozer will be working at on a given day based upon work planned for that site. The bulldozer can then be moved to another site another day according to the work flow plan created by system 200. This allows a user of system 200 to use equipment more efficiently across a plurality of sites. Additionally, because report 231 can be updated, changes in the need for an asset at one site can be factored into the machine work flow plan for that asset at another site. For example, if there is a delay at another site which makes the use of a bulldozer unnecessary for a few days, this data can be input into system 200 to generate an updated report 231. As a result, the work flow at site 400 may be changed due to the availability of the bulldozer. Alternatively, the breakdown of equipment at another site may necessitate transferring equipment from site 400. System 200 can be used to determine which equipment should be transferred from site 400 to the other site(s) and to develop a new report 231 and machine work flow plan(s) 241 to account for changes in the availability of equipment at site 400.

In one embodiment, system 200 can be configured to generate machine work flow plans. In the embodiment of FIG. 2, report generator 230 can generate machine work flow plan 241 which is conveyed to a particular vehicle working on site 400. Machine work flow plan 241 describes in detail where a particular vehicle will pick up a load of material on site 400 and where that load will be dropped off by that vehicle. Thus, machine work flow plan 241 can describe each load which is carried or moved by a particular vehicle on site 400. It is noted that a respective machine work flow plan can be generated for each vehicle which is moving material on site 400. In one embodiment, machine work flow plan 241 is sent via a wireless transmitter 240 to its respective vehicle. Wireless transmitter 240 can utilize a variety of wireless communication systems such as a cellular telephone network, a WiFi communication network, a radio network, or other wireless communication network to convey machine work flow plan 241 to a respective vehicle on site 400.

FIG. 3 shows an example cost scenario generated in accordance with one embodiment. In the embodiment of FIG. 3, column 301 shows the distance that a material is to be moved. For example, the distances of 0-100 meters, 100-200 meters, 200-500 meters, and greater than 500 meters are defined. Column 2 defines the vehicles comprising the vehicle pool at site 400. In the present example, a bulldozer (e.g., D6R), a scraper, and an excavator and dump trucks (e.g., 320 and D400 respectively) are defined. Additionally, cost scenario shows the use of either 1, 2, or 3 dump trucks on site 400. Column 303 defines the hourly ownership and operating cost for each vehicle(s) of the vehicle pool. Columns 304-309 define the volume of material per hour which each of the vehicle(s) can move. Columns 304 and 305 define the volume per-hour of wet and dry clay respectively that can be moved by the vehicle(s) of the vehicle pool. Columns 306 and 307 define the volume per-hour of wet and dry topsoil respectively that can be moved by the vehicle(s) of the vehicle pool. Columns 308 and 309 define the volume per-hour of wet and dry rock respectively that can be moved by the vehicle(s) of the vehicle pool.

Columns 310-315 define the cost per linear cubic meter for moving materials using the vehicle(s) of the vehicle pool of site 400. In the example of FIG. 3 the cost per linear cubic meter is determined by dividing the hourly ownership and operating cost by the volume per hour that can be moved by that vehicle(s) times the farthest distance defined in column 301. Columns 310 and 311 define the cost per linear cubic meter for moving wet and dry clay respectively by the vehicle(s) of the vehicle pool. Columns 312 and 313 define the cost per linear cubic meter for moving wet and dry topsoil respectively by the vehicle(s) of the vehicle pool. Columns 314 and 315 define the cost per linear cubic meter for moving wet and dry rock respectively by the vehicle(s) of the vehicle pool.

In FIG. 3, column 304 shows that the greatest volume of wet clay can be moved in the distance of 0-100 meters using the bulldozer (D6R). In the distance of 100-200 meters, the greatest volume of wet clay can be moved using either of the bulldozer (D6R), the scraper, or the combination of an excavator (e.g., 320) and either two or three dump trucks (e.g., D400). In the distance between 200-500 meters, the greatest volume of wet clay can be moved using the combination of the excavator and three dump trucks. An analysis of columns 305-309 shows that the vehicle(s) capable of moving the most material depends upon the type of material, its moisture content, and the distance the material is to be moved.

Column 310 of FIG. 3 shows that the most cost effective (e.g., the lowest cost per linear cubic meter of material moved) vehicle for moving wet clay for a distance of 0-100 meters is the bulldozer. Thus, the bulldozer can move the greatest amount of wet clay per hour and at the lowest cost for a distance of 0-100 meters. In the distance of 100-200 meters, the scraper is the most cost effective vehicle for moving wet clay. Thus, while either of the bulldozer, the scraper, or the combination of the excavator and two or three dump trucks are capable of moving the same volume of wet clay per hour, cost scenario 300 identifies the scraper as the most cost effective vehicle for moving wet clay a distance between 100 and 200 meters.

Referring again to FIG. 4, if the distance between location 411 and 431 of site 400 is 100-200 meters, then either of bulldozer 450, scraper 451, or dump trucks 453a, 453b, and/or 453c in conjunction with an excavator (not shown) can move the greatest volume of wet clay as indicated by column 304 of cost scenario 300. However, column 310 of cost scenario 300 indicates that scraper 451 is the most cost effective vehicle to use when moving wet clay for this distance.

In column 310, the combination of the excavator and two dump trucks is shown to be the most cost effective use of the vehicle pool to move wet clay a distance between 200 and 500 meters. This is in contrast to the data in column 304 which indicates that the combination of the excavator and three dump trucks is capable of moving the greatest volume of wet clay per hour. Thus, if a user is more concerned with moving the greatest volume of wet clay per hour, cost scenario 300 indicates that an excavator and 3 dump trucks should be used. However, if the user is more concerned with the most cost effective vehicle combination, cost scenario 300 indicates that the user should use an excavator in combination with 2 dump trucks.

Referring again to FIG. 4, if the distance between location 412 and 432 of site 400 is 200-500 meters, then dump trucks 453a, 453b, and 453c in conjunction with an excavator (not shown) can move the greatest volume of wet clay as indicated by column 304 of cost scenario 300. However, column 310 of cost scenario 300 indicates that using only two of the dump trucks, in conjunction with the excavator, is the most cost effective vehicle mix to use when moving wet clay for this distance.

For moving wet clay a distance greater than 500 meters, column 304 indicates that a combination of an excavator and 3 dump trucks can move the greatest volume per hour. Column 310 of cost scenario 300 indicates that the combination of an excavator and 3 dump trucks is also the most cost effective vehicle mix for moving wet clay a distance greater than 500 meters.

Referring again to FIG. 4, if the distance between location 413 and 433 of site 400 is greater than 500 meters, then dump trucks 453a, 453b, and 453c in conjunction with an excavator (not shown) can move the greatest volume of wet clay as indicated by column 304 of cost scenario 300. Additionally, column 310 of cost scenario 300 indicates that using all three of the dump trucks in conjunction with the excavator is also the most cost effective vehicle mix to use when moving wet clay for this distance.

Figure 5A:
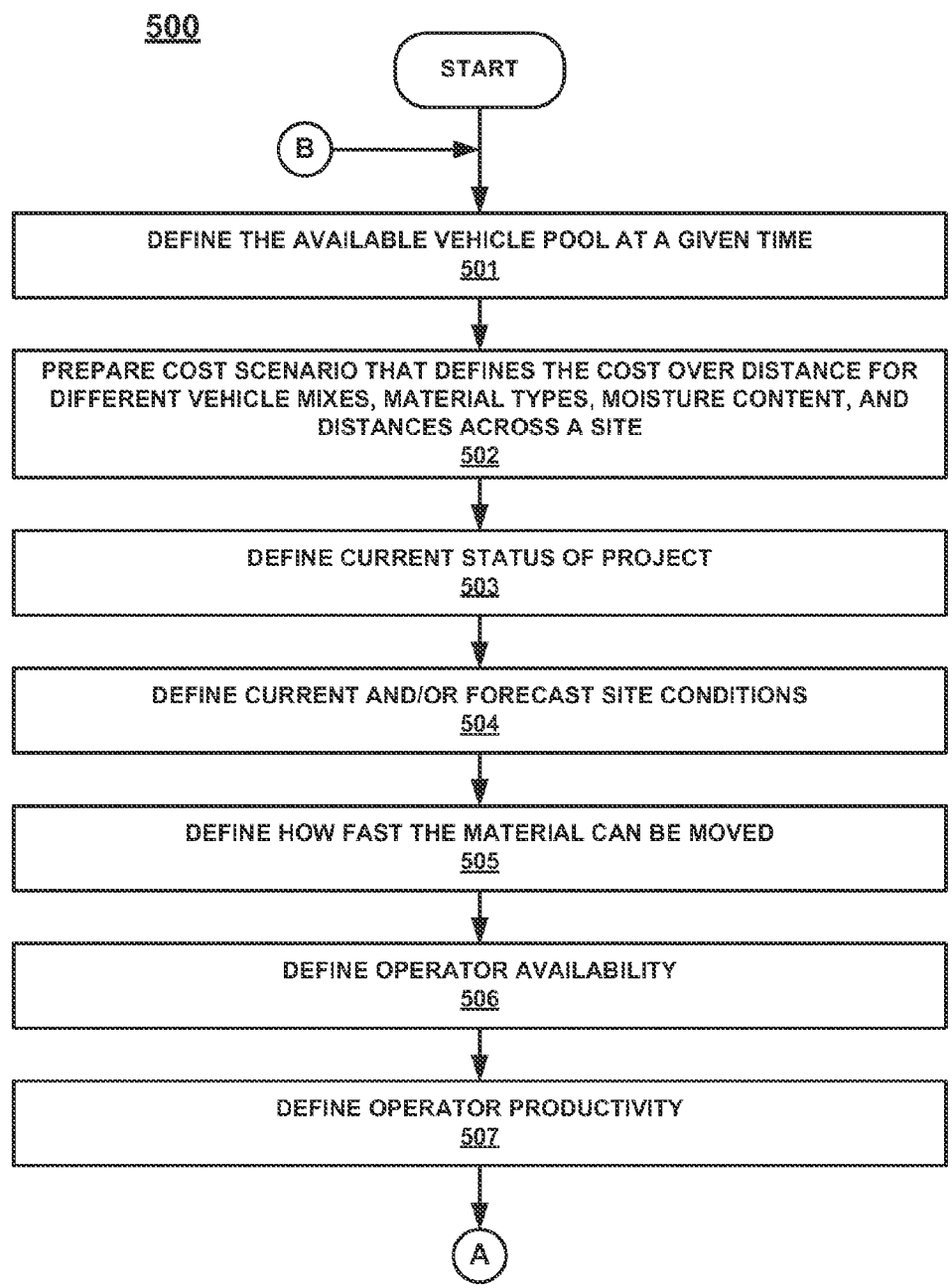
FIGS. 5A and 5B are an example flowchart implemented by a system for asset management of a material on a construction site in accordance with one embodiment.
Figure 5B:
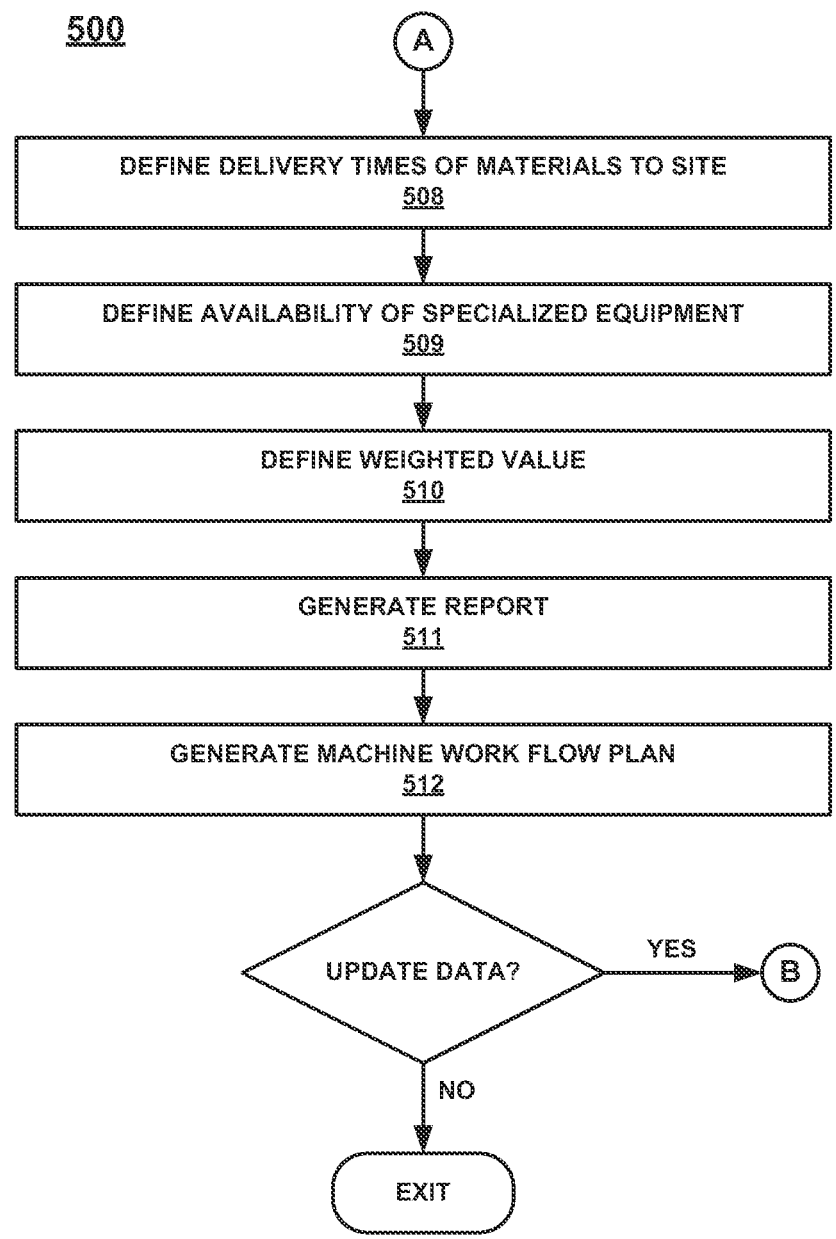

FIGS. 5A and 5B are an example flowchart implemented by a system (e.g., 200) for asset management of a material on a construction site in accordance with one embodiment. In operation 501 of FIG. 5A, the available vehicle pool at a given time is defined. At a given point in time, the available vehicles for a vehicle pool can change depending upon scheduled maintenance, when rented machines are available, how long it takes to get vehicles to a site, the demands for vehicles at another site, equipment failure, etc. In one embodiment, this vehicle pool data is received by cost scenario generator 210.

In operation 502 of FIG. 5A, a cost scenario is prepared that defines the cost over distance for different vehicle mixes, material types, moisture content, and distances across a site. As described above with reference to FIG. 3, cost scenario 300 can be generated using data from equipment manufacturer's handbooks for vehicles in a vehicle pool and/or historical data for vehicles in the vehicle pool which is input into cost scenario generator 210. In one embodiment, this data can be accessed from a database which is coupled with system 200. Cost scenario generator 210 uses this data to generate at least one cost scenario which defines, but is not limited to, the cost over distance for different vehicle mixes based upon the available vehicles in the vehicle pool. In one embodiment, the cost scenario accounts for different material types, moisture content of the different materials, the ownership and operating costs for the vehicles, and distances which the material may be moved around the site. This facilitates assigning tasks at the site based upon available vehicles, the material being moved, and other conditions which may impact the decision to use a particular vehicle for a given task.

Additionally, by changing the vehicle pool data, different cost scenarios can be created which facilitate identifying whether it is advantageous to bring in additional vehicles to the vehicle pool from outside the site. These vehicles could be rented, purchased, or currently located at another site by the user of system 200. Thus, in one embodiment, the cost of renting or purchasing vehicles, or other equipment, can be input to cost scenario generator 210. For example, if additional vehicles become available during a project, a user can determine if it is advantageous to use those vehicles at the current site, or at another site.

As described above with reference to FIG. 3, cost scenario 300 identified the rate at which a given type of material can be moved depending upon which vehicles are being used to move the material. Additionally, cost scenario 300 shows that the cost for moving a material varies depending upon which vehicles are being used to move the material and the distance the material is being moved. Cost scenario 300 also showed that the least expensive mix of vehicles for moving the material may not in every instance be the fastest.

In operation 503 of FIG. 5A, the current status of a project is defined. In one embodiment, an up-to-date electronic model of the site is created and input into, for example, status determiner 220. The current status can be the initial terrain configuration of a site, or show the terrain configuration after some contouring of the terrain has occurred. The electronic model of the site can be based upon, but not limited to, real time terrain updates from the site, site surveys, aerial photography, laser scanning, or other methods for determining the terrain configuration of the site. Real time terrain updates may include updates from vehicles or other machines and devices on the site. For example, a dump truck can log the geographic coordinates (as determined by a GNSS or other position determining system) as well as the volume and type of material which is deposited at a location of a site.

In one embodiment, the current status of the project includes a cut/fill status which shows where material has been cut, or is to be cut, from the site. The cut/fill status also can show where cut and fill sections are located on the site. In one embodiment, a color coded map of areas of cut and fill is created which is optionally tagged with an attribute of the material type (e.g., wet clay, dry clay, rock, etc.) to enable system 200 to determine where cut material can be used on a site.

In operation 504 of FIG. 5A, the current and/or forecast site conditions are defined and input into status determiner 220. In one embodiment, site conditions are optionally defined for system 200. As described above, site conditions can indicate whether a particular type of vehicle is better suited for a particular task on a site. For example, standard dump trucks operate well on paved or gravel roads, but are not well suited for hauling loads in muddy conditions. Instead, an articulated dump truck is typically better suited for muddy or rough terrain conditions. Thus, system 200 is configured to receive site condition data to facilitate determining the mix of vehicles of a vehicle pool at a site, as well as identifying tasks for those vehicles to perform and when those tasks should be performed. As an example, the current and/or forecast weather conditions can be defined. This can be based upon historical, or currently recorded weather data for that site. As an example of historical weather data, it can be determined that it rains at a site 30% of the period for which a particular project is scheduled.

Additional site conditions can indicate the type of roads present on a site. As an example, during a construction project, the terrain at the site is modified to create the final terrain configuration. This may also include the building of temporary roads to facilitate the movement of materials, or the construction of a more permanent road which is part of the final terrain model. Thus, as the building of these roads proceeds, the site conditions can be modified to reflect changes in the status of the project. Additionally, the width and surface material of a road affects the speed at which the vehicles can move around the site and the round trip time required for a vehicle to haul and dump a load of material and return to pick up another load. Furthermore, if an unimproved road on the site is muddy because of recent rains, the movement of wheeled vehicles on this road will be slower. Thus, identifying site conditions facilitates determining how materials are to be moved around the site, and by what type of vehicle.

Another example of site conditions is a geological report of the area. This can include the location, depth, and types of soil at the site. As described above with reference to FIG. 3, the cost of moving different types of materials varies for different vehicles of the vehicle pool. Additionally, some types of material are better suited for use as fill than others. As an example, clay is not well suited as a fill material while rock is. As a result, the clay may have to be hauled offsite, or deposited in another location of site 400 away from fill section 430. The geological report can also be used to determine the volume of material which will be moved to various locations of the site. Furthermore, knowledge of the soil types around a worksite, as well as recent weather data, can be used by moisture content estimator 211 to estimate the moisture content of soil at the site.

In operation 505 of FIG. 5A, the speed at which a material can be moved is defined. In one embodiment, the speed at which a material can be moved is input to status determiner 220. When material is moved around site 400, or via public roads outside of site 400, the traffic conditions and traffic loading will affect the speed at which material can be moved. A traffic variable can be defined and input to status determiner 220 to account for the varying cost of moving material depending upon the traffic conditions. In one embodiment, the traffic conditions can be in part defined by what time of day the material is being moved. For example, during typical rush hour periods, it can be input to status determiner 220 that it takes twice as long to move material outside of site 400. This data can be modified based upon actual conditions. Additionally, traffic conditions on site 400 can vary depending upon what projects are in progress. Thus, the traffic conditions on site 400 itself can also be input to status determiner 220, and updated periodically throughout the day, to account for traffic conditions on site 400.

In operation 506 of FIG. 5A, the operator availability at a site is defined. In one embodiment, the availability of operators for vehicles of the vehicle pool at site 400 is optionally input to status determiner 220. The availability of operators for the various vehicles on site 400 can affect the progress of the project. For example, a lack of trained operators for an excavator will affect whether using dump trucks to move material on site 400 is an option. As another example, if there are five bulldozers on site 400, but only three bulldozer operators, this will affect the options for moving material on site 400. Another consideration is whether to work some, or all, of the operators overtime during a project. As an example, if there is an incentive bonus being paid to complete the project at site 400 earlier than a given date, it may be advantageous to pay the additional overtime wages. In another example, if there are not enough operators for all of the vehicles on a site, system 200 can be used to determine whether it is advantageous to have some operators work overtime to make up for lost productivity. In one embodiment, a database coupled with system 200 can be accessed which lists each of the vehicle operators available at site 400 and which vehicles each operator is trained to operate. This data can be accessed by status determiner 220 to assist in determining how to move material around site 400.

In operation 507 of FIG. 5A, the productivity of an operator is defined. In one embodiment, input regarding the productivity of some, or each, operator of a vehicle on site 400 can be optionally input to status determiner 220. There are commercially available software programs which are capable of recording operator productivity levels for each type of vehicle which they operate. In one embodiment, the identity of an operator of each vehicle used on site 400 can be input to status determiner 220. The data regarding the productivity of that operator for the type of vehicle which will be operated can then be accessed and used to assist in determining how to move material around site 400. For example, if a particular operator of a bulldozer moves only 90% of the blade capacity of the bulldozer on average, the operator may have to make additional pushes with the bulldozer to move the full volume of material which is required. This data can be used in determining how many pushes with bulldozers will be needed to complete a task. One embodiment uses this data to assign tasks to that operator and others on site 400.

In operation 508 of FIG. 5B, the delivery times of materials to the site is defined. In one embodiment, the delivery of materials can be optionally input to status determiner 220. Examples of the delivery of materials include, but are not limited to, the delivery of manufactured items such as pipes or pre-cast structures, the delivery of concrete, the delivery of asphalt, the delivery of base coarse materials, etc. As discussed above, the delivery of materials will affect whether a project can proceed, or should be halted. This can also determine whether resources, such as vehicles, can be diverted from a halted project to another project on site 400, or to another site away from site 400. The delivery of materials to other sites outside of site 400 may also determine whether resources can be diverted to site 400 from outside sites.

I operation 509 of FIG. 5B, the availability of specialized equipment at a site is defined. In one embodiment, the availability of specialized equipment is optionally input to status determiner 220. This data can be used by system 200 to prioritize events on site 400. As an example, if paving equipment will not be available for 2 weeks, it may not be advantageous to complete the preparation of the roadbed earlier than when the paving equipment becomes available. The vehicles and resources used to prepare the roadbed could be diverted to other tasks until some point at which preparation of the roadbed can resume. In one embodiment, system 200 can use the availability of specialized equipment on site 400 to prioritize projects on site 400 and/or prioritize tasks for vehicles on site 400.

In operation 510 of FIG. 5B, a weighted value is defined. In one embodiment, user defined variables are optionally input to report generator 230. For example, a user can assign a weighted value of 100% to completing the project on site 400 as early as possible. This may be in order to make resources used on site 400 available to other projects. In another example, if an incentive bonus will be paid to complete the project early, the user of system 200 may wish to use a vehicle mix which moves the greatest volume of material in a given time period. Alternatively, if there is no incentive to complete the project before a certain date, a user of system 200 may assign a weighted value of 100% to minimize the cost of moving material around site 400. In other words, the user may wish to use a vehicle mix which moves the material at the lowest cost. Referring again to FIG. 3, cost scenario 300 conveys how much material can be moved in a given time period (e.g., cubic meters per hour as shown in column 304 of FIG. 3) as well as the cost of moving material (e.g., cost/linear cubic meter as shown in column 310 of FIG. 3). Thus, It is noted that ratio of cost versus speed may be indicated using the weighted value. For example, a user of system 200 may assign a weighted value of 80% to minimize the cost of moving material and a weighted value of 20% to moving the material in the shortest amount of time. It is noted that other variables in addition to the cost of moving material or the rate of moving material can receive weighed values in one embodiment.

In operation 511 of FIG. 5B, a report is generated. As described above with reference to FIG. 2, report 231 is generated by report generator 230. In one embodiment, report generator receives status data of site 400 as well as one or more cost scenario(s) 300 from cost scenario generator 210. Simulator 235 is configured to simulate the movement of earth, or other materials, based on the vehicle type being used. In other words, a simulation can be run for each machine type on a pass by pass basis for bulldozers and scrapers, or a bucket by bucket basis for excavators, or for a combination of a mixture of vehicle types being used on site 400. As described above, the simulation can account for variables such as soil type and moisture content, site conditions, operator availability and productivity, equipment and material availability, or other variables. In one embodiment, simulator 235 is configured to run a plurality of simulations in which the vehicle mix, load carried by each vehicle, and other parameters are changed in order to determine an advantageous plan for moving material around site 400.

Report 231 comprises at least one mass haul plan which specifies a vehicle from the vehicle pool and a load of material which is to be moved by that vehicle. The mass haul plan also identifies a first location of site 400 where the material is picked up by a vehicle and a second location of site 400 where the load is dropped off by that vehicle. In one embodiment, report 231 can specify each load carried by each vehicle on site 400 as well as the In contrast, conventional mass haul plans show where a cut section is located, where a fill section is located, and the distance to move the fill material from the cut section to the fill section. Typically, the distance is from the center mass of the cut section to the center mass of the fill section receiving material from the cut section. In contrast, report 231 provides greater detail regarding where material is picked up and deposited and by which vehicle on a load by load basis. In so doing, report 231 gives a much more precise simulation of the cost, and time to complete a project on site 400.

In one embodiment, report generator 230 generates a plurality of reports 231 to simulate a variety of options a user of system 200 can exercise in allocating the use of resources on site 400. In one embodiment, report generator 230 creates a summary report 232 which conveys to a user of system 200 the cost of implementing a particular option based upon the reports 231 which have been generated. For example, report generator 230 may create 5 separate reports 231 which implement different mixes of vehicles from the vehicle pool. Summary report 232 can describe the cost of implementing each of the options as well as the anticipated completion date based upon implementing that option. Summary report 232 can also describe which mix of vehicles from the vehicle pool to use. For example, this can describe on a day to day basis which vehicles to use on site 400. Summary report 232 can also describe which operators to use and which vehicle that operator should use. Summary report 232 can also recommend adding additional vehicles to the vehicle pool. This can include bringing in additional equipment from other sites, or renting or purchasing additional equipment. In one embodiment, summary report 232 can also generate an approximate work flow for each vehicle on site 400 based upon its assumed start location. In other words, the schedule of movement of each vehicle on site 400 can be planned by system 200.

In operation 512 of FIG. 5B, a machine work flow plan is generated. In one embodiment, a machine workflow plan for each vehicle can be optionally generated by report generator. Referring to FIG. 2, report generator 230 also creates machine work flow plan 241 which is conveyed wirelessly to a corresponding vehicle of the vehicle pool using wireless transmitter 240. It is noted that it is not required to convey the machine work flow plan wirelessly in one embodiment. In one embodiment, wireless transmitter 240 sends a respective machine work flow plan 241 to each vehicle on site 400.

Alternatively, wireless transmitter 240 may only send a respective machine work flow plan 241 to each earthmoving vehicle on site 400. In one embodiment, each vehicle on site 400 is configured with a display which tells an operator which location to drive to in order to pick up a load of material, how material to load or move, and the location where the material is to be dropped off. The display may also tell the operator which route to take when moving the material and the return route to pick up a second load of material.

In one embodiment, each vehicle on site 400 is equipped with reporting systems which are configured to report back to system 200 in order to update report 231. Thus, upon moving a load of material and depositing it at a location of site 400 according to machine work flow plan 241, the event is logged and electronically transmitted to event receiver 225 which inputs this data to status determiner 220. This data is used to update report 231 based upon the current status of site 400. For example, an operator may not move as much material as planned, or may dump the material at the wrong location. This information can be input to system 200 so that new machine work flow plans 241 can be generated to account for differences between the planned movement of material around site 400 and the actual movement of that material.

The following discussion describes the use of system 200 to manage the movement of a material on a site in accordance with one embodiment. It is noted that all of the features and operations described below are not necessary in each embodiment. Furthermore, the following discussion is not intended to imply a particular sequence of operations. Referring again to FIG. 4, a user of system 400 will be building road 420. A digital model of the terrain of site 400 (e.g., the current site status) is either input to status determiner 220, or is created by status determiner 220 based upon data such as survey data, aerial photography, laser scanning, a combination of the above, or some other method for conveying the configuration of site 400. The user also inputs, or creates, a digital model of the final terrain configuration of site 400 (e.g., the desired site status). The user can also input, or create, interim digital models of site 400 which represent various stages in the construction project. As discussed above, region 410 represents a cut section where soil is to be removed (e.g., from a hillside) while region 430 represents a fill section where soil is to be deposited to fill an area. For the purpose of the following discussion, it is assumed that at least a portion of the soil removed from region 410 will be deposited in region 430 as fill.

The user of system 200 also inputs the vehicles comprising the vehicle pool for site 400. In the present example, the vehicle pool on site 400 comprises a bulldozer 450, a scraper 451, an excavator (not shown) and a plurality of dump trucks 453a, 453b, and 453c via cost scenario generator 210. This data may also include the availability dates of one or more vehicles (e.g., due to scheduled maintenance) comprising the vehicle pool. It is noted that this data can be accessed via a database, or other data storage device. The user can also input data such as vehicles which could be rented or purchased supplement the vehicle pool as well as vehicles at other sites which could potentially transferred to site 400 and the availability dates of those vehicles. In one embodiment, cost scenario generator 210 generates at least one cost scenario 300 which describes the cost to move soil, and/or the volume of soil that can be moved in a time period, based upon the vehicle used, the soil type and moisture content, and the distance which the soil will be moved. It is noted that other variables affecting the cost to move soil, and/or the volume of soil that can be moved in a time period, can be included in cost scenario 300 in another embodiment.

The user of system 200 also inputs data to status determiner 220 such as current site conditions and/or forecast site conditions for the period when construction will take place on site 400. The user also inputs how fast material can be moved on site 400 as well as operator data such as operator availability and/or operator productivity, scheduled maintenance for vehicles in the vehicle pool. The user also inputs the delivery times of materials to site 400 which can also account for offsite traffic conditions and the availability of specialized equipment. The user of system 200 also inputs similar data for one or more sites other than site 400.

Simulator 235 uses the data from status determiner 220 as well as cost scenario 300 to generate a plurality of simulations. Simulator 235 is configured to simulate various conditions on site 400 including, but not limited to, movement of soil using various combinations of vehicles on site 400, various times for moving the soil, and movement of soil varying distances within site 400. This simulation is done on a load by load basis for each vehicle on site 400. In other words, each movement of soil by a vehicle on site 400 is modeled. Additionally, each simulation models a different mix of vehicle types for moving soil as well as different variations in where a particular vehicle picks up a load of soil and where that vehicle offloads, or dumps, the material. Each simulation can simulate the movement of soil from the current terrain status of site 400 to a desired status such as an interim, or final terrain configuration of site 400. The various simulations also account for the parameters discussed above which may affect how the project is completed.

The user of system 200 also assigns a weighted value which is used to facilitate selecting at least one of the simulations created by simulator 235. As discussed above, the user can place a greater weight on early completion of the project on site 400, completing the project at the lowest cost, or some combination thereof. This information is used by report generator 230 in identifying at least one of the simulations which most closely matches the weighted value identified by the user. For example, if the user identifies completing the project at the earliest possible date, report generator 230 will select one or more of the simulations created by simulator 235 which predict the earliest dates for completing the project on site 400. For the purposes of the present discussion, it is assumed that report generator generates 5 reports 231 which detail the load by load movement of soil for each vehicle on site 400. Thus, the user is presented with 5 options for how to implement the project on site 400.

Report generator 230 also generates summary report 232 which gives the user an overview of the reports 231 including, but not limited to, the cost of implementing each of the options as well as the anticipated completion date based upon implementing that option. Summary report 232 can also describe which mix of vehicles from the vehicle pool to use. For example, this can describe on a day to day basis which vehicles to use on site 400. Summary report 232 can also describe which operators to use and which vehicle that operator should use. Summary report 232 can also recommend adding additional vehicles to the vehicle pool. This can include bringing in additional equipment from other sites, or renting or purchasing additional equipment. Summary report 232 can also include delivery dates for equipment and/or materials from off of site 400 in order to optimize the work flow.

When the user indicates which of the options will be implemented to complete the project on site 400, report generator 230 then generates machine work flow plans 241 for each vehicle or other machine used on site 400. These machine work flow plans can be generated in near real time, hourly, daily, or at some other interval. These machine work flow plans are then conveyed to wireless transmitter 240. Wireless transmitter 240 then sends each machine work flow plan to the respective vehicle on site 400. As each task assigned to a vehicle is completed, the event is logged using equipment on the respective vehicle and a wireless message is sent to system 200. Event receiver 225 receives the event logging message from each respective vehicle and inputs that data into status determiner 220. Based upon the logged event data, status determiner 220 updates the current site status of the project. Based upon the updated site status, report generator 230 can cause simulator 235 to generate at least one new simulation based upon the updated current site status. Based upon the new simulation run by simulator 235, report generator 230 can generate a new report 231, a new summary report 323, and/or a new machine work flow plan 241, or a combination of the above. The user of system 200 can then decide whether to implement the new work flow based upon the new report 231 and the new summary report 323. If the user decides to implement the new plan, the new machine work flow plan 241 can be sent wirelessly to the vehicle(s) which are affected by the new work flow. It is again noted that the generation of a new simulation may instead be performed periodically (e.g., hourly, daily, etc.) in one embodiment.

Figure 6:
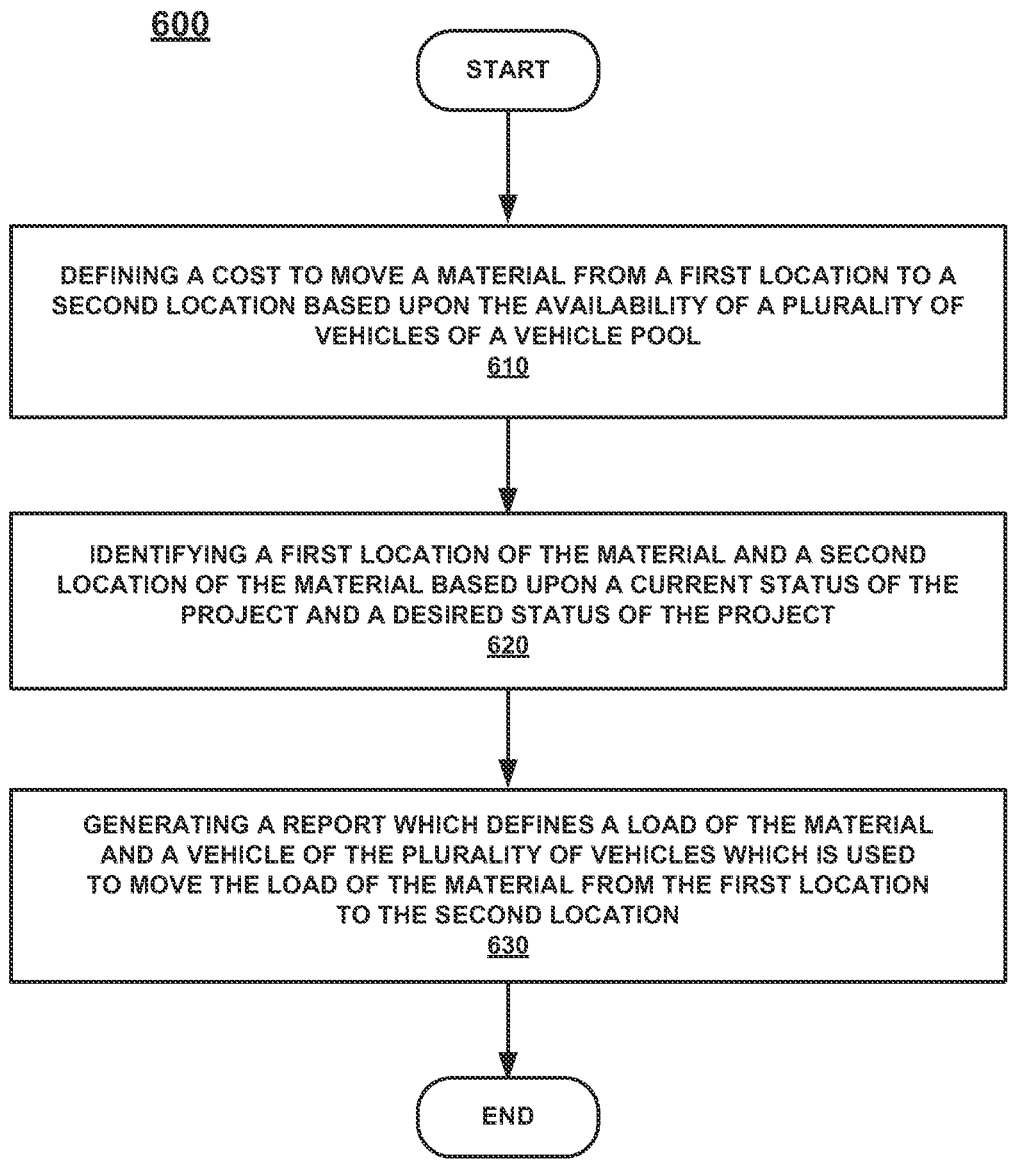
FIG. 6 is a flowchart of a method of asset management of a material on a construction site in accordance with one embodiment.

FIG. 6 is a flowchart of a method of asset management of a material on a construction site in accordance with one embodiment. In operation 610 of FIG. 6, a cost to move a material from a first location to a second location based upon the availability of a plurality of vehicles of a vehicle pool is defined. As described above, cost scenario generator 210 generates at least one cost scenario which defines the cost to move material. With reference to FIG. 3, cost scenario 300 defines the different costs to move materials based upon the type, and condition, of the material, the type of vehicle used to move the material, and the distance the material is moved. Cost scenario 300 therefore provides detailed information on how the movement of material on a site affects the cost, and/or the completion date, of a project.

In operation 620 of FIG. 6, a first location of the material and a second location of the material are identified based upon a current status of the project and a desired status of the project. Based upon a comparison of the current site status and a desired site status, system 200 can identify a first location for picking up material and a second location where the material is to be dropped off or dumped. Referring again to FIG. 4, status determiner 220 receives, or creates, a digital model of site 400 which indicates its current configuration. Status determiner 220 also receives, or creates, a digital model of site 400 which indicates a desired status. It is again noted that the desired status of site 400 can be the final terrain configuration of site 400 after a project has been completed or an interim terrain configuration of site 400 during the project. As discussed with reference to FIG. 4, system 200 is configured to identify a first location (e.g., 411 of FIG. 4) at which material is to be picked up from the cut section of region 410. System 200 is further configured to identify a second location (e.g., location 431 of FIG. 4) at which the material is to be dropped off or dumped at the fill section of region 430. In one embodiment, simulator 235 can generate on a load by load basis a plurality of simulations for moving the material from location 411 to location 431 using different vehicle mixes of the vehicles available on site 400. In contrast, conventional mass haul plans typically describe the volume and direction of movement of material from the center mass of where the fill material is cut to the center mass of the fill section receiving the fill material.

In operation 630 of FIG. 6, a report is generated which defines a load of the material and a vehicle of the plurality of vehicles which is used to move the load of the material from the first location to the second location. Based upon the current status of the site and the desired status of the project, simulator 235 can generate a plurality of simulations which model various options for moving vehicle on a load by load basis. This facilitates identifying the vehicle mix which can move the material to best suit parameters identified by a user. For example, if the user wants to move the greatest volume of material using the available vehicle mix, simulator 235 can generate at least one scenario which identifies how to move the greatest volume of material based upon the available vehicle mix. Report generator 230 can then generate a report 231 which identifies, on a load by load basis, how the material should be moved. Each load of material is identified by where the vehicle is to pick up the material (e.g., the first location) and where the material is to be dropped off or dumped (e.g., the second location). The report can also include information such as how much material and what type of material is to be moved.

Figure 7:
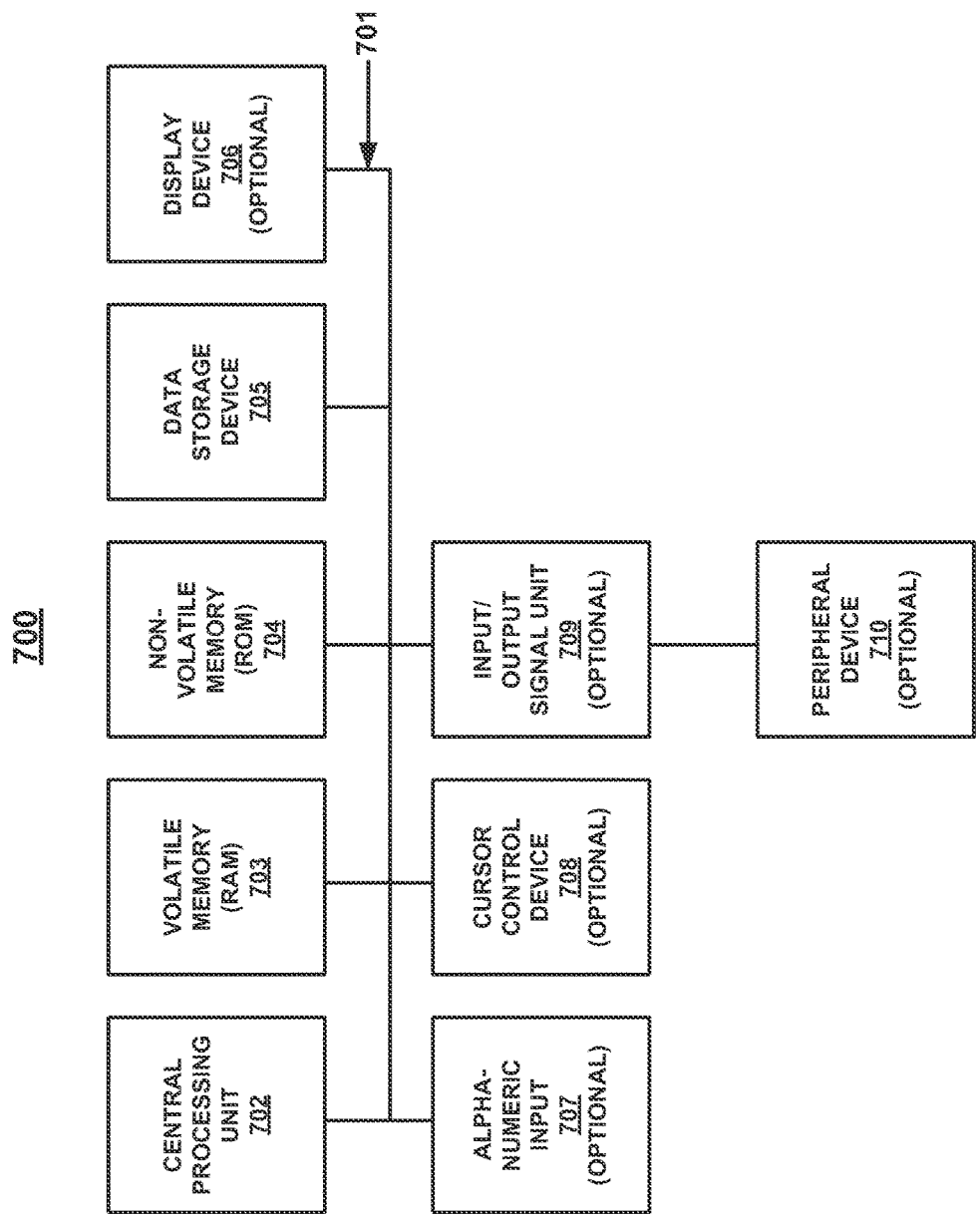
FIG. 7 is a block diagram on an example computer system used in accordance with one embodiment.

With reference to FIG. 7, embodiments are comprised of computer-readable and computer-executable instructions that reside, for example, in computer system 700 which is used as a part of a general purpose computer network (not shown). It is appreciated that computer system 700 of FIG. 7 is intended as an example and that embodiments can operate within a number of different computer systems including general-purpose computer systems, embedded computer systems, laptop computer systems, hand-held computer systems, and stand-alone computer systems. It is noted that system 200 of FIG. 2 can be implemented on computer system 700.

In the present embodiment, computer system 700 includes an address/data bus 701 for conveying digital information between the various components, a central processor unit (CPU) 702 for processing the digital information and instructions, a volatile main memory 703 comprised of volatile random access memory (RAM) for storing the digital information and instructions, and a non-volatile read only memory (ROM) 704 for storing information and instructions of a more permanent nature. In addition, computer system 700 may also include a data storage device 705 (e.g., a magnetic, optical, floppy, or tape drive or the like) for storing vast amounts of data. It should be noted that the software program for performing asset management of a material on a construction site in accordance with embodiments can be stored either in volatile memory 703, data storage device 705, or in another data storage device (not shown).

Devices which are optionally coupled to computer system 700 include a display device 706 for displaying information to a computer user, an alpha-numeric input device 707 (e.g., a keyboard), and a cursor control device 708 (e.g., mouse, trackball, light pen, etc.) for inputting data, selections, updates, etc. Computer system 700 can also include a mechanism for emitting an audible signal (not shown).

Returning still to FIG. 7, optional display device 706 of FIG. 7 may be a liquid crystal device, cathode ray tube, or other display device suitable for creating graphic images and alpha-numeric characters recognizable to a user. Optional cursor control device 708 allows the computer user to dynamically signal the two dimensional movement of a visible symbol (cursor) on a display screen of display device 706. Many implementations of cursor control device 708 are known in the art including a trackball, mouse, touch pad, joystick, or special keys on alpha-numeric input 707 capable of signaling movement of a given direction or manner displacement. Alternatively, it will be appreciated that a cursor can be directed and/or activated via input from alpha-numeric input 707 using special keys and key sequence commands. Alternatively, the cursor may be directed and/or activated via input from a number of specially adapted cursor directing devices.

Furthermore, computer system 700 can include an input/output (I/O) signal unit (e.g., interface) 709 for interfacing with a peripheral device 710 (e.g., a computer network, modem, mass storage device, etc.). Accordingly, computer system 700 may be coupled in a network, such as a client/server environment, whereby a number of clients (e.g., personal computers, workstations, portable computers, minicomputers, terminals, etc.) are used to run processes for performing desired tasks.

Embodiments of the present technology are thus described. While the present technology has been described in particular embodiments, it should be appreciated that the present technology should not be construed as limited by such embodiments, but rather construed according to the following claims.

What is claimed is:

1. A method for management of a cut and fill operation on a construction site, said method comprising:
    receiving, by a computer, a digital model of the construction site, the digital model identifying cut regions of the construction site where a material is to be removed and fill regions of the construction site where the material is to be deposited;
    receiving, by the computer, information about each vehicle in a vehicle pool comprising a plurality of vehicles, the received information including type of each vehicle, load capacity of each vehicle, and operating costs of each vehicle, wherein the vehicle pool includes different types of vehicles having different load capacities and different operating costs;
    generating, by the computer, a cost scenario that defines cost over distance for each vehicle in each vehicle pool based at least on the load capacity of each vehicle, the operating cost of each vehicle, type of the material, and moisture content of the material;
    receiving, by the computer, site conditions including type of roads between the cut regions and the fill regions of the construction site and geological information about the cut regions;
    generating, by the computer, a report based on the digital model, the cost scenario, and the site conditions that includes a machine work flow plan for each vehicle in the vehicle pool, each machine work flow plan identifying loads of the material that are to be moved by a respective vehicle and a travel route between said cut region and said fill region for each load;
    transmitting, from the computer, a respective machine work flow plan to each vehicle in the vehicle pool;
    receiving, by the computer and from each vehicle, an actual drop-off location of each load of said material moved by said respective vehicle and machine control information for said respective vehicle, wherein each vehicle is equipped with a Global Navigation Satellite System (GNSS) system and a machine control system;
    calculating, by the computer, differences between actual movement of said material and planned movement of said material for each vehicle;
    generating, by the computer, a new machine work flow plan for each vehicle that accounts for the difference between said actual movement of said material and said planned movement of said material for each vehicle;
    transmitting, from the computer, a new respective machine work flow plan to each vehicle such that the new respective machine work flow plan replaces the respective machine work flow plan for each vehicle;
    and implementing, by at least one vehicle, the new respective machine work flow plan, thereby modifying operations of the at least one vehicle based on the new respective machine work flow plan.

2. The method as recited in claim 1 further comprising updating the cost scenario based upon a change in availability of at least one of said plurality of vehicles of said vehicle pool.

3. The method as recited in claim 1 wherein the report models each movement of said material, with vehicles of said vehicle pool.

4. The method as recited in claim 1 wherein the respective machine work flow plan is wirelessly transmitted to each vehicle in the vehicle pool.

5. The method as recited in claim 1 wherein the travel route between the cut region and the fill region for each load is determined based on the type of roads between the cut regions and the fill regions.

6. The method as recited in claim 1 wherein the moisture content of said material is determined based on predicted weather conditions at the construction site.

7. The method as recited in claim 1 wherein said method further comprises: defining at least one variable selected from the group consisting of: a distance to move said material from said cut region to said fill region, a road condition between said cut region to said fill region, how fast said material can be moved from said cut region to said fill region, a time when said material is moved from said cut region to said fill region, and a weather variable.

8. The method as recited in claim 1 wherein said method further comprises:
    receiving an indication of a weighted value which is used to assign a load of said material to a particular vehicle of said vehicle pool and wherein said weighted value is selected from the group consisting of: minimizing cost and maximizing volume of said material.

9. The method as recited in claim 1 wherein said method further comprises:
    receiving an indication selected from the group consisting of: availability of an operator for a vehicle, and productivity of said operator of said vehicle.

* * * * *